US005696907A

United States Patent [19]
Tom

[11] Patent Number: 5,696,907
[45] Date of Patent: Dec. 9, 1997

[54] SYSTEM AND METHOD FOR PERFORMING RISK AND CREDIT ANALYSIS OF FINANCIAL SERVICE APPLICATIONS

[75] Inventor: Mohimm Daniel Tom, Clifton Park, N.Y.

[73] Assignee: General Electric Company, Schenectady, N.Y.

[21] Appl. No.: 395,213

[22] Filed: Feb. 27, 1995

[51] Int. Cl.$^6$ .................................................. G06F 3/00
[52] U.S. Cl. ................................................ 395/238
[58] Field of Search ................ 364/408; 395/20–23, 395/51, 61, 75, 76, 238

[56] References Cited

U.S. PATENT DOCUMENTS

| | | | |
|---|---|---|---|
| 5,262,941 | 11/1993 | Saladin et al. | 364/408 |
| 5,359,699 | 10/1994 | Tong et al. | 395/22 |
| 5,398,300 | 3/1995 | Levey | 395/22 |

OTHER PUBLICATIONS

"A Neural Network Model for Bankruptcy Prediction" by Marcus D. Odom, et al, Oklahoma State University, pp. II–163–II–168.

"Risk Assessment of Mortgage Applications with a Neural Network System: An Update as the Test Portfolio Ages" by Douglas L. Reilly, et al, of Nestor, Inc., Providence, R.I., pp. II–479–II–482.

"Multiple Regression Analysis", Introduction to Probability and Statistics, William Mendenhall, Sixth Edition, Duxbury Press, Boston 1983, pp. 457–489.

McLeod et al., "Predicting Credit Risk: A Neural Network Approach", Journal of Retail Banking, vol. 15, No. 3, 1993, pp. 37–40.

Hsieh, "Some Potential Applications of Artificial Neural Systems in Financial Management", Journal of Systems Management, vol. 44, No. 4, Apr. 1993, pp. 12–15.

Robins, "Credit Scoring: Can Retailers Benefit from Neural Networks?", Stores, vol. 75, No. 4, Apr. 1993, pp. 34–35.

Jost, "Neural Networks", Credit World, vol. 81, No. 4, Mar. 1993, pp. 26–33.

*Primary Examiner*—Kevin J. Teska
*Assistant Examiner*—Stephen J. Walder, Jr.
*Attorney, Agent, or Firm*—David C. Goldman; Marvin Snyder

[57] ABSTRACT

The present invention discloses a method and system for performing risk and credit analysis of financial service applications with a neural network. The neural network imitates and perfects a credit manager's evaluation and decision process to control loss and guide business expansion. In particular, the neural network screens applications to control loss and to find directions where business volume can increase with a minimum increase in loss. Initially, data variables are pre-processed and applied to the neural network. The neural network in the present invention is optimized by a non-iterative regression process, as opposed to the computationally intensive back propagation algorithm.

34 Claims, 7 Drawing Sheets

SYSTEM AND METHOD FOR PERFORMING RISK AND CREDIT ANALYSIS OF FINANCIAL SERVICE APPLICATIONS

BACKGROUND OF THE INVENTION

The present invention relates generally to risk analysis and more particularly to performing risk and credit analysis of financial service applications.

In the financial services industry, an increase in profit is typically brought about by an increase in volume of financial service contracts, reduction of loss from active financial service contracts, or a combination of both. The major source of loss is typically due to default in payment by financial service applicants. Therefore, it is important that financial service applications be carefully screened in order to reduce incidences of default in payment. Screening financial service applications with stringent criteria can lead to significant loss reduction when economic hardship is foreseeable from the applicant's financial status. However, stringent approval criteria may also lead to a reduction in the number of approvals of financial service applications and thus lead to a slower growth of the volume of financial service contracts. Therefore, it is necessary to reduce loss without reducing the growth of the volume of financial service contracts, or better yet, by controlling the criteria used to approve financial service applications, to gain significant increase in volume of financial service contracts without incurring a significant increase in loss.

To overcome this risk prediction and credit evaluation problem, neural network technology has been used in several financial services applications. For example, in Reilly et al., *Risk Assessment of Mortgage Applications with a Neural Network System*, PROCEEDINGS OF THE INTERNATIONAL JOINT CONFERENCE ON NEURAL NETWORKS, Washington, D.C., 1990, vol. II, pp. 479–482, a neural network has been used for risk assessment in mortgage insurance underwriting and in Odom et al., *A Neural Network Model For Bankruptcy Prediction*, PROCEEDINGS OF THE INTERNATIONAL JOINT CONFERENCE ON NEURAL NETWORKS, San Diego, 1990, vol. II, pp. 163–168, a neural network has been used to predict bankruptcy. Both Reilly et al. and Odom et al. use a conventional multi-layer feed forward neural network, which typically includes a layer of input nodes, a layer of output nodes, and one or more hidden layers of nodes between the input and output nodes. Each node in each layer is connected to one or more nodes in the preceding or following layer, possibly to an output terminal, and possibly to one or more input terminals. The connections are made via adjustable-weight links. Before being placed in operation, the multi-layer feed forward neural network must be trained by a process known as the back propagation algorithm which iteratively adjusts the connection weights and offsets, using pairs of known input and output data, until the errors between the actual and known outputs are acceptably small. A problem with the multi-layer feed forward neural network is that it is difficult to analyze, since the hidden layers perform functions that are unfamiliar even to experts in the application domain. Moreover, the back propagation algorithm is plagued by its iterative and therefore computationally intensive nature. Also, since the sigmoid nonlinearity associated with each node requires an evaluation of the hyperbolic tangent function or the exponential function, node function evaluations are computationally intensive. Another problem associated with the conventional multi-layer feed forward neural network is that there are a number of different sets of variables associated with risk analysis applications that need to be separated to be evaluated, whereas the multi-layer feed forward neural network examines these sets of variables together and not separately.

SUMMARY OF THE INVENTION

Therefore, it is a primary objective of the present invention to perform risk and credit analysis of financial service applications using a neural network that is not computationally intensive, evaluates a number of different sets of variables associated with risk analysis separately, and provides a measure of risk at the output of the neural network.

Another object of the present invention is to provide a neural network whose architecture and weights can be easily examined to infer directions where business volume can increase with a minimum increase in loss. Guidelines for approving financial service applications can then be rewritten according to these directions and issued to credit managers.

In the present invention, the neural network imitates and perfects a credit manager's evaluation and decision process to control loss and guide business expansion. In particular, the neural network screens applications to control loss, and its architecture and connection weights provide a means to find directions where business volume can increase with a minimum increase in loss. Initially, the architecture of the neural network in the present invention is determined with the expertise of credit managers, and all processing nodes have pre-specified functions. This contrasts with multi-layer feed forward neural networks which have unspecified hidden layer node activities. Nonlinearities within the processing nodes are defined by data from financial service applications, and not by the fixed hyperbolic tangent or sigmoid used in conventional multi-layer feed forward neural networks. So, the neural network in the present invention is free from the computationally intensive evaluations of the hyperbolic tangent function or the exponential function of the sigmoid nonlinearity. The neural network in the present invention is optimized by a non-iterative regression process, as opposed to the computationally intensive back propagation algorithm. Data from a recently filed financial service application is sent to the optimized neural network for evaluation. Then the neural network outputs a measure of risk.

Thus, in accordance with the present invention, there is provided a computer implemented method for performing risk and credit analysis of financial service applications with a neural network having an input layer of processing nodes, an output layer having a processing node, and an intermediate layer of processing nodes coupling the input layer to the output layer. The method comprises collecting data and status information from a plurality of previously approved financial service applications. The application data are applied into the input layer of the neural network. The data at the input layer of the neural network are organized into a plurality of groups. Each of the plurality of groups contains ordinal or categorical variables used to perform risk and credit analysis pertinent to that group's pre-specified function. Each of the plurality of groups of data from the input layer is applied to a separate processing node of the intermediate layer. The data from each of the separate processing nodes at the intermediate layer of the neural network are applied to the processing node of the output layer. The status information is applied to the processing node of the output layer and the processing nodes of the intermediate layer of the neural network. The neural network weights are then optimized to generate an approval criteria that increases the approval volume of financial service applications with a minimum loss. Then data from a recently filed financial service application is sent to the optimized neural network for evaluation. The neural network weights are examined. Guidelines for approving financial service applications are rewritten according to observations of the network weights and issued to credit managers for future use.

While the present invention will hereinafter be described in connection with a preferred embodiment and method of use, it will be understood that it is not intended to limit the invention to this embodiment. Instead, it is intended to cover all alternatives, modifications and equivalents as may be included within the spirit and scope of the present invention as defined by the appended claims.

DETAILED DESCRIPTION OF THE PRESENT INVENTION

Figure 1:
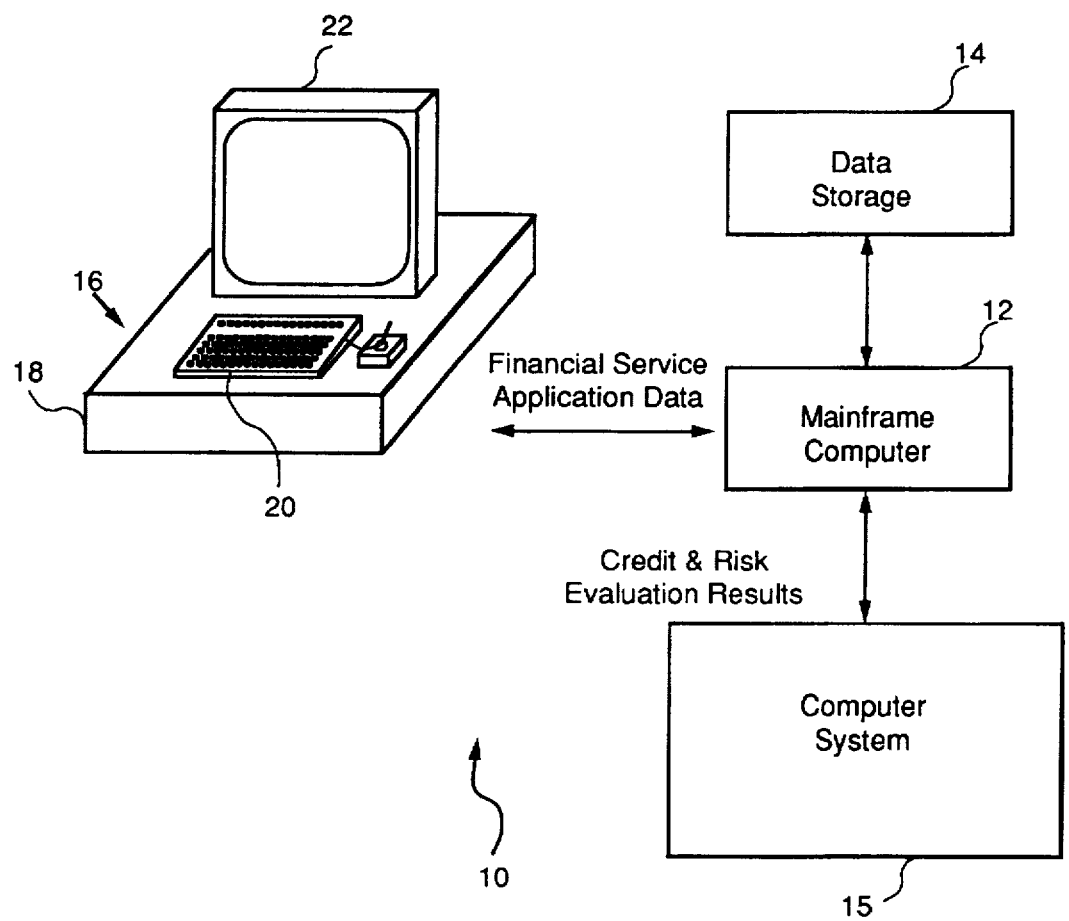
FIG. 1 is a block diagram of the risk and credit analysis system used in the present invention.

FIG. 1 shows a block diagram of a risk and credit analysis system 10 that embodies the present invention. The risk and credit analysis system 10 includes a mainframe computer 12 for processing large volumes of data stored in a data storage unit 14. The data is taken from previously approved financial service applications that have become active contracts for over twenty-four months and that contain various variables used to perform risk prediction and credit evaluations. Also, connected to the mainframe computer 12 is a personal computer or workstation 15 that contains a neural network used for analyzing financial service applications. The neural network and its operation is described below in further detail. An IBM 3270 terminal or a personal computer or work station 16 having a hard drive 18, an input device such as a keyboard 20 and mouse, and an output device such as a display 22 and printer are connected to the mainframe computer 12. The computer 16 is used to examine a newly proposed financial service application in association with the mainframe computer 12. In particular, information from the newly proposed financial service application is sent from the computer 16 to the mainframe computer 12, which activates computer 15 where the neural network is accessed and used to provide a risk prediction and credit evaluation of the financial service application.

Figure 2:
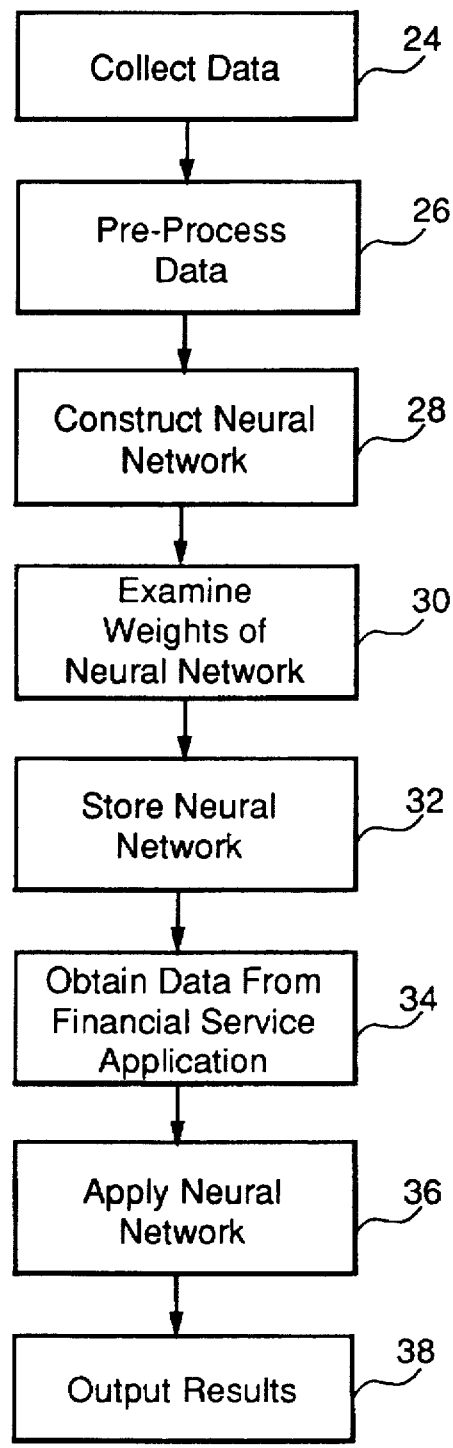
FIG. 2 is a flow chart illustrating the operation of the present invention.

FIG. 2 is a flow chart illustrating the operation of the risk and credit analysis system 10. First, application data is collected at 24 from previously filed financial service applications that have become active contracts for least twenty-four months from the date of approval. The application data is then pre-processed into a plurality of groups having various variables at 26 and analyzed with the status of the financial service application after twenty-four months. Next, a neural network model is constructed at 28. In the present invention, the neural network is a hierarchical neural network, the structure of which is determined under the guidance of credit managers, and the neural network weights are optimized by a non-iterative process. The optimized weights of the neural network are examined at 30 to infer the direction of approval criteria relaxation for increasing the approval volume of financial service applications. The neural network is then stored at 32. After obtaining data from a newly proposed financial service application at 34, the neural network is applied at 36. The risk prediction and credit evaluation of the new financial service application is then outputted at 38.

Figure 3:
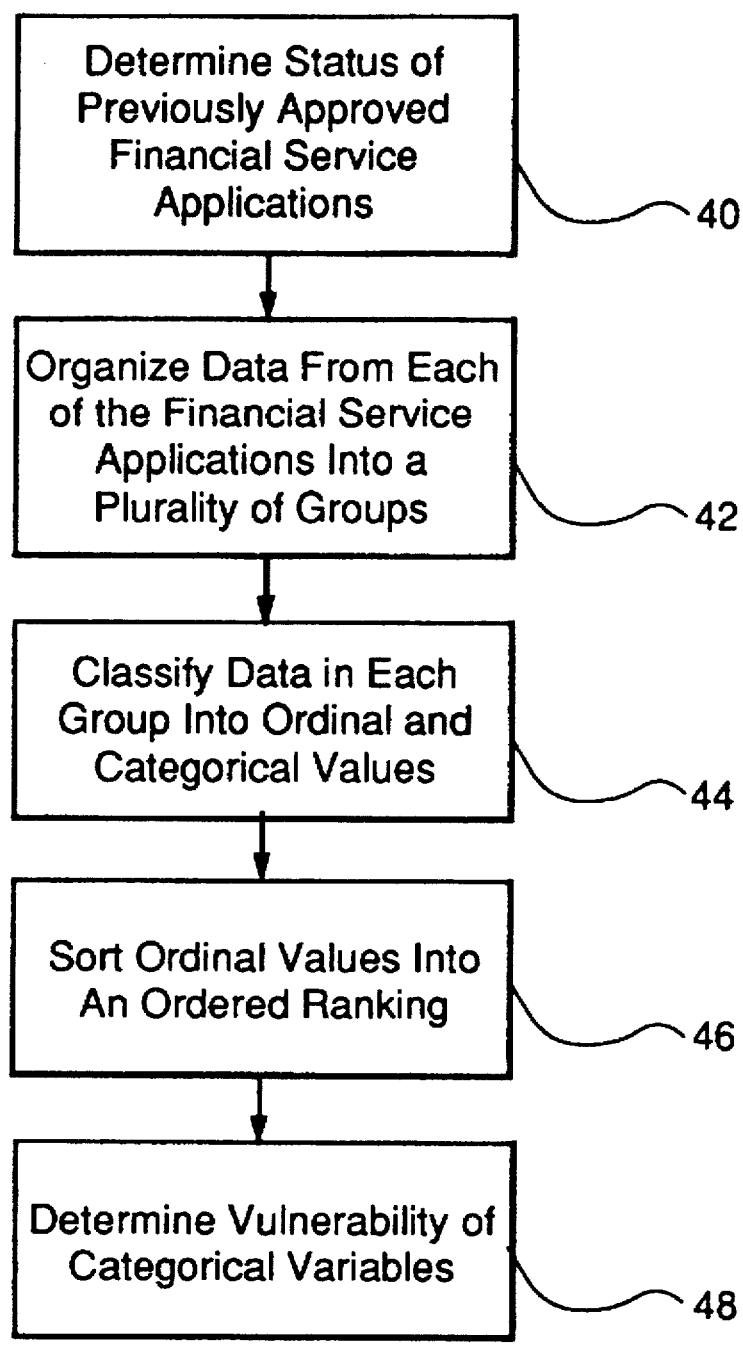
FIG. 3 is a flow chart describing a pre-processing operation.

FIG. 3 is a flow chart describing the pre-processing operation 26 that is performed on the data collected from the plurality of previously approved financial service applications. First, before the data is processed, the previously approved financial service applications are examined at 40 to determine the status. The status of the financial service application may be classified as (1) a termination due to default in payment; (2) an early termination by the applicant; (3) a normal termination; and (4) an account still open without any delinquencies present during the 24 month period. Contracts that are either terminated early (2) or due to default (1) are grouped into a class labeled as unacceptable. Applications that are normally terminated (3) or that are still (4) open and without delinquencies are grouped into another class labeled as acceptable. The two classes, unacceptable and acceptable, respectively, are used later to construct the neural network model.

After the status of the applications have been examined, the data from each of the applications are organized into a plurality of groups at 42. An example of a few of the groups used in the present invention are employment stability, residence stability, credit history, debts and income, and miscellaneous. Each of the plurality of groups contain variables used to perform the risk and credit analysis. For example, variables in the employment stability group may include years at current employment, years at previous employment, primary occupation category, and total income. The variables in the residence stability group may include years at current address, years at previous address, whether the applicant owns, rents, or lives in the residence. The variables in the income and debts group may include disposable income, income/capitalized vehicle cost ratio, mortgage/long term debt ratio, debt to income ratio, lease payment/income ratio, total payment/capitalized vehicle cost ratio, lease payment/capitalized vehicle cost ratio. The variables in the credit history group may include number of credit bureau inquiries, number of accounts too new to rate, number of derogatory remarks, number of accounts 30 days late, number of accounts 60 days late, number of accounts 90 days late, number of bank loans, number of finance loans, and number of revolving loans. Some of the variables in the miscellaneous group may include prior repossessions or bankruptcy indicator, prior automobiles purchased indicator, car versus truck or van, number of dependents, etc. The variables in the group depend on the particular risk analysis and credit evaluation application. In the illustrative embodiment, the present invention is used in an automobile leasing application.

Figure 4:
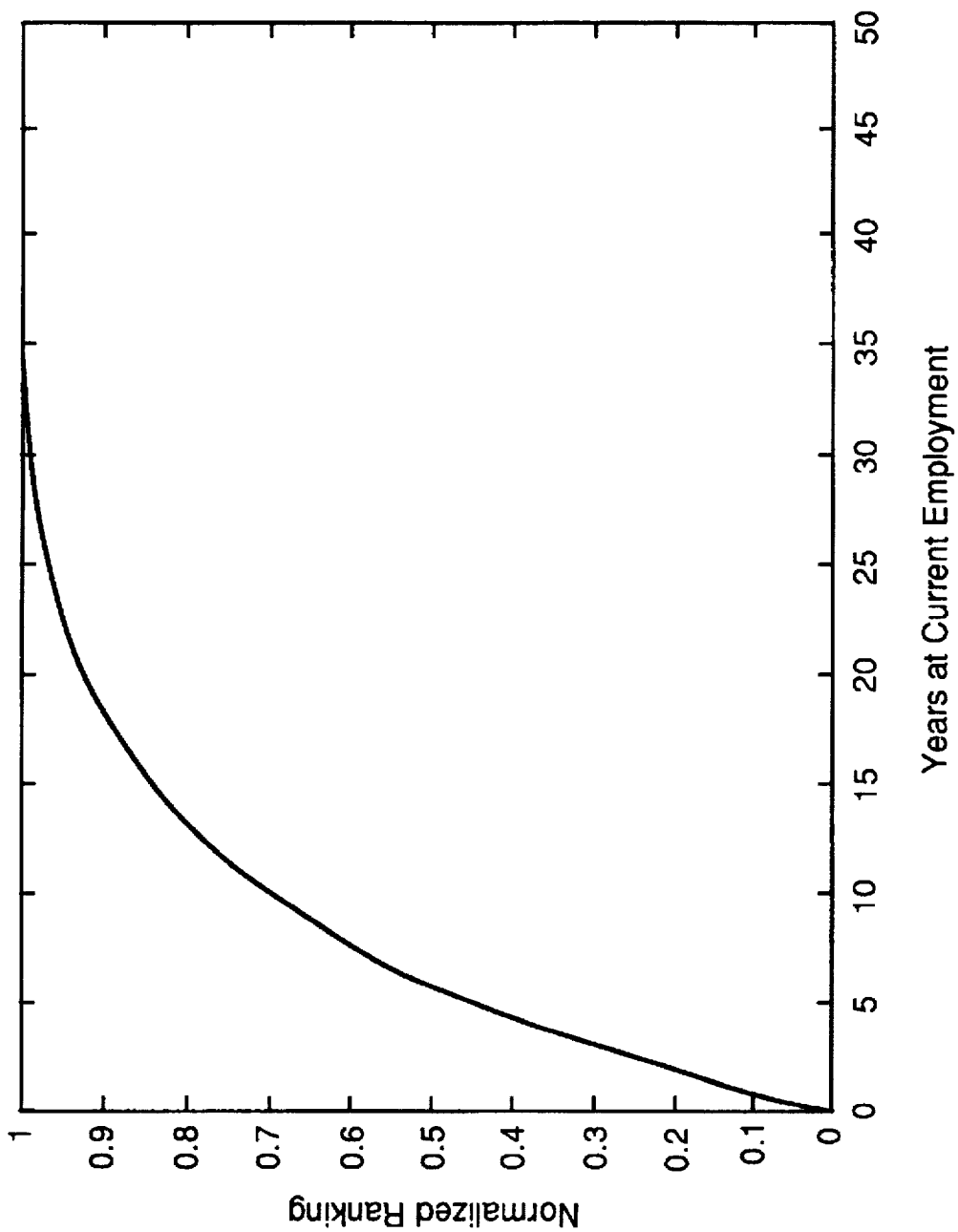
FIG. 4 is an example of a plot of a ordered ranking of an ordinal value used in the present invention.
Figure 5:
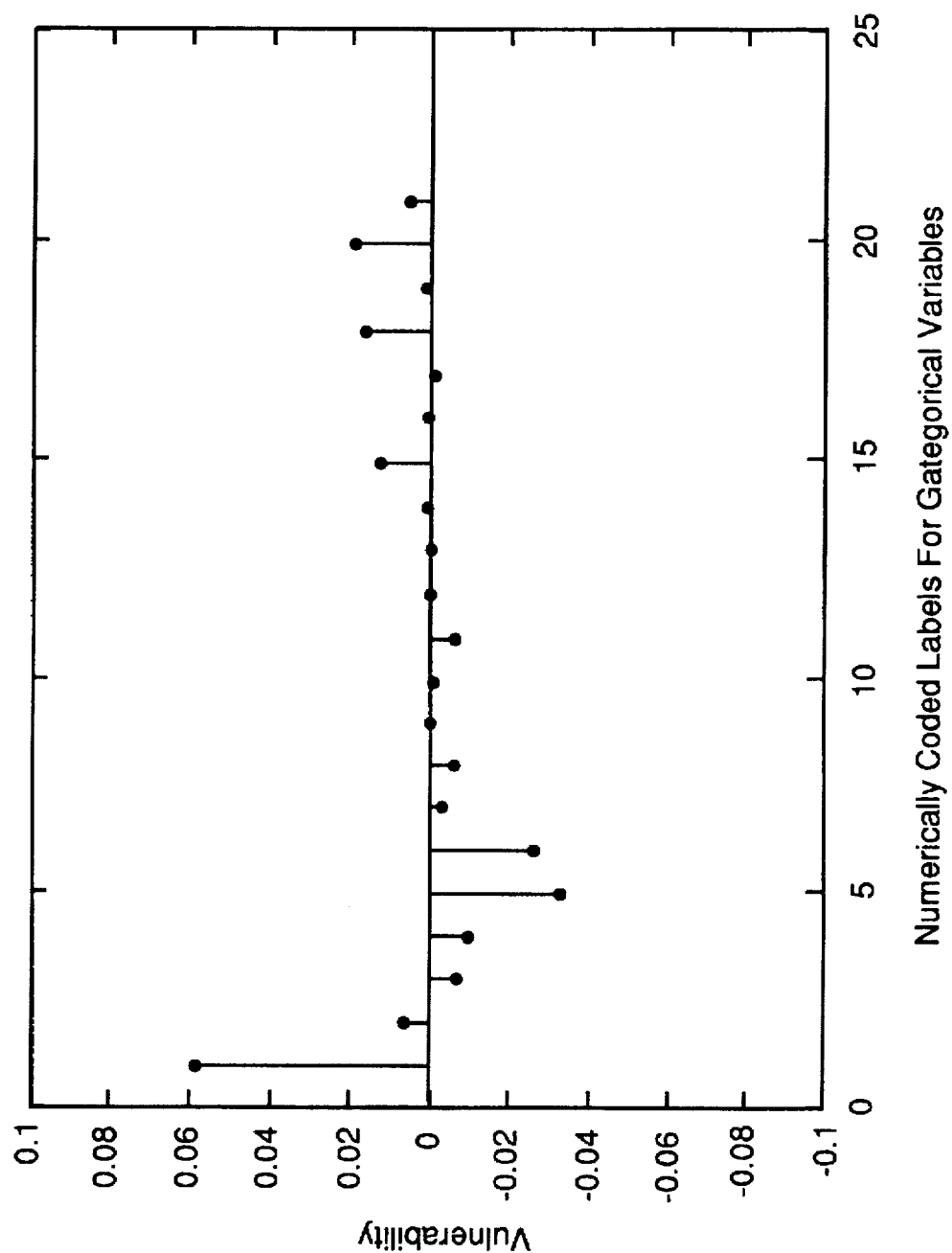
FIG. 5 is an example of a plot of vulnerability for a categorical value used in the present invention.

After the data has been organized into the plurality of groups, the data variables in each group are classified into ordinal variables and categorical variables at 44. Ordinal variables are variables that have numerical values. Categorical variables are variables that have numerically coded labels or other identifier labels. Next, values of ordinal variables of previously approved financial service applications are sorted at 46 into an ordered ranking from the highest ordinal value to the lowest ordinal value. The highest ordinal value is assigned a one, the lowest ordinal value is assigned a zero, and values in between the highest and lowest ordinal value are assigned a value scaled linearly between zero and one based on the sorted order, and not based on the ordinal value itself. An example of a plot of the ordered ranking for the variable years at current employment in the employment stability group is shown in FIG. 4. For each of the categorical variables, a measure of vulnerability is determined at 48. Vulnerability is the susceptibility of a variable to either the acceptable or unacceptable class as defined above. For example, the vulnerability of a label X is the proportion of the population of samples having the label X within the unacceptable class, minus the proportion of the population of samples having the label X within the acceptable class. An example of a plot of the vulnerability for the variable primary occupation category in the employment stability group is shown in FIG. 5.

After the data has been pre-processed, the neural network decision model is ready to be constructed. The neural network decision model is constructed according to the pre-processed data and a credit manager's knowledge about the financial service business. Typically, credit managers use heuristics to guide them in their evaluation and approval process of financial service applications. For example, one heuristic may be the shorter the current employment time, the more likely there will be a default in payment. In a risk prediction and credit evaluation of a typical financial service application, the credit manager has to consider many different economic variables in parallel. However, it is very difficult for the human mind to consider more than 5 to 7 variables in parallel. In the present invention, a hierarchical decision process is used to consider a large number of variables in parallel. In particular, small groups of data having no more than 5 to 7 variables within each group are considered separately from other groups. These values are then grouped into intermediary variables, and the final decision is made based on the evaluations of the intermediary variables.

Figure 6:
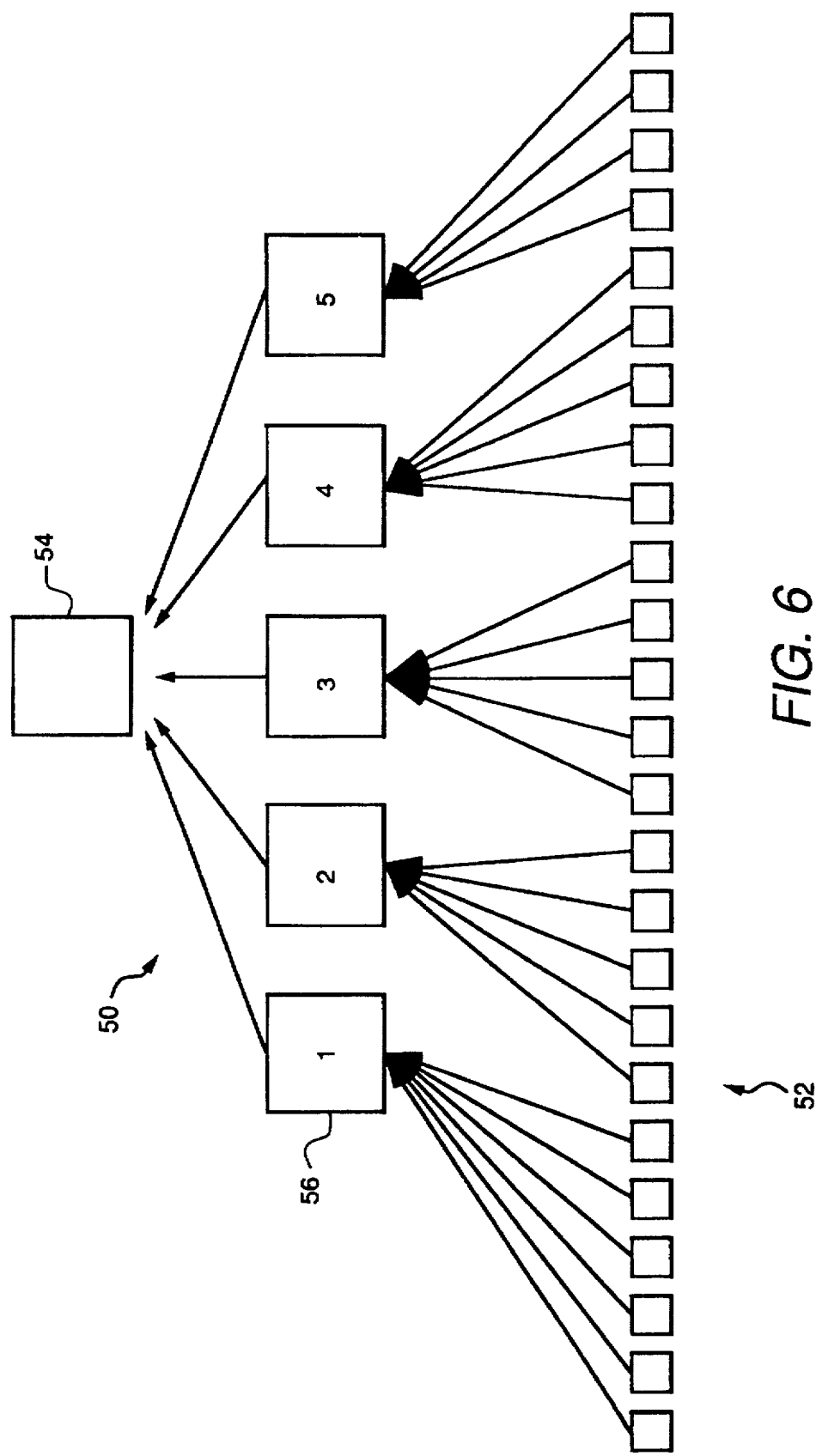
FIG. 6 is a hierarchical neural network used in the present invention.

The hierarchical neural network 50 of the present invention is shown in FIG. 6. The hierarchical neural network includes an input layer of processing nodes 52, an output layer having a processing node 54, and an intermediate layer of processing nodes 56 coupling the input layer to the output layer. The input layer of processing nodes 52 receives the data from the previously filed financial service applications stored in the data storage 14. The data is pre-processed at the input layer of the neural network in the manner set forth in FIG. 3 and organized into the plurality of groups comprising employment stability, residence stability, credit history, debt & income, and miscellaneous. Then the data variables are applied to the intermediate layer of processing nodes 56. In the illustrative embodiment, the intermediate layer comprises five processing nodes that each receive different variables from a specific group. For example, processing node 1 may receive variables for the employment stability group, processing node 2 may receive variables for the residence stability group, processing node 3 may receive variables for the credit history group, processing node 4 may receive variables for the debt and income group, and processing node 5 may receive variables for the miscellaneous group. Then the intermediary variables from the intermediate layer of processing nodes 56 are combined at the output layer 54 to attain the final decision. The hierarchical neural network 50 is easy to analyze as compared to the conventional feed forward neural network having hidden layer units. Also, the hierarchical neural network 50 evaluates a number of different sets of variables separately as compared to the conventional feed forward neural network.

The input layer of the processing nodes 52 is connected to the intermediate layer of the processing nodes 56 by weighted connections and the intermediate layer is connected to the output layer by weighted connections. In the current embodiment, the weighted connections are determined from the data and status information of previously approved financial service applications, and not assigned by the experienced credit manager. For any given processing node, the weights of the connections between the node and its inputs are determined by building a general linear model with a multiple regression analysis using the status information of the applications as the dependent variable (with instances of the acceptable class assigned a 1, and the instances of the unacceptable class assigned a −1,) against the data applied to the inputs of the node as independent variables. The coefficients of the independent variables are estimated by the regression and become the corresponding weights to the inputs of the node.

The linear regression is first performed for every processing node of the intermediate layer 56, wherein each node has weights connected to the variables of the group for which the intermediary variable represents. The intermediate layer of processing nodes are evaluated by obtaining the sum of the pre-processed data multiplied with the weights just obtained. The values are then sorted, ranked, and normalized to values between 0 and 1 in the manner described above. Next, a linear regression is performed for the processing node 54 of the output layer, which has weights connected to the intermediary variables. Then, the sum of the product of the normalized intermediary variables and the corresponding weights obtained by the regression is used to compute the final evaluations of the hierarchical neural network 50. A more detailed discussion on multiple regression analysis is provided in Mendenhall, *Introduction to Probability*, 456–489 (1983), which is incorporated herein by reference. After all the weights of the neural network 50 have been determined, it is stored in computer 15 which is used to provide risk and credit evaluations of newly proposed financial service applications.

Figure 7:
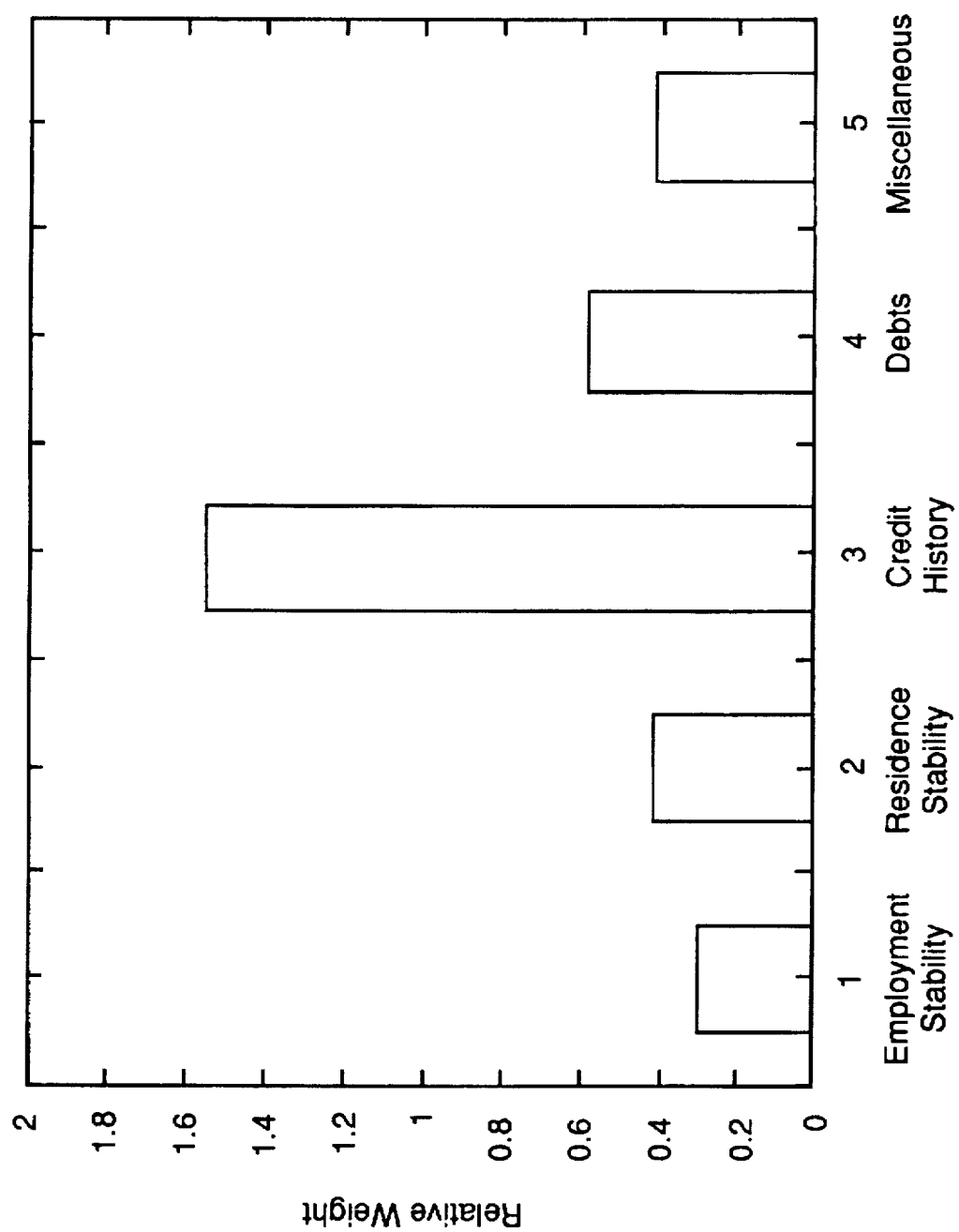
FIG. 7 is a plot showing the relative weights of connections from the output node to the intermediate nodes in the hierarchical neural network.

The weights obtained by the above non-iterative process may not agree with the subjective weighting used by a credit manager because the neural network model 50 is optimized to predict abnormal contract terminations within the first twenty-four months of the contract. The magnitudes of these subjective connection weights used by the credit manager reflect the importance of the variables in the criteria in predicting risk and perform credit analysis. The subjective weights have either a positive influence, a negative influence in the opposite direction, or little or no influence on the decision to approve financial service applications. Whether these weights as conceived by the credit manager will correspond to the optimal decision or the most accurate evaluation is unknown, because the credit manager does not get performance feedback once a contract is approved except on a monthly basis and on a portfolio level. However, the neural network model 50 is optimized to predict abnormal contract terminations within the first twenty-four months of the contract, so its weights are more suitable to infer directions of relaxation to achieve business expansion while controlling loss. One method used to infer directions of relaxation of approval criteria would be to examine the magnitude of the weights. In general, the smaller the weight, the less influential is the variable connected to that weight, and the more the approval criterion may be relaxed in that direction. FIG. 7 is a plot showing the relative weights from the final evaluation node to the five intermediate nodes. An approximate ranking of the influence of the variables is obtained by multiplying the first level weights to the second level weights. This ranking is not absolute, since there is a nonlinearity in between.

Another approach that could be used to infer directions of relaxation of approval criteria would be to evaluate a set of sample financial service applications with the hierarchical neural network model 50. The 10% lowest and highest risk financial service applications are selected. The profiles for these financial service applications are then compared and contrasted to each other. The lowest and highest risk applications typically have very distinct profiles (i.e., population distributions) in some variables and some similar profiles in other variables. The data variables from the similar profile are the approval criteria that could be relaxed without much increase in loss. Guidelines can then be issued to credit managers informing them of the relaxed approval criteria.

As mentioned above, the neural network 50 has particular utility in the automobile leasing business, where it is necessary to minimize loss due to repossession and early termination while expanding business volume. However, the neural network can be applied to a variety of applications such as the acquisition of leasing portfolios, where entire portfolios are rated in a consistent manner. In addition, the neural network can be applied to the automobile retail financing business, both in the consumer level and in the portfolio level. Outside of the automobile leasing business, the neural network can be applied to any commercial credit evaluation, where data is scarce, and heuristics are rich.

It is therefore apparent that there has been provided in accordance with the present invention, a method and system for performing risk and credit analysis of financial service applications that fully satisfy the aims and advantages and objectives hereinbefore set forth. The invention has been described with reference to several embodiments, however, it will be appreciated that variations and modifications can be effected by a person of ordinary skill in the art without departing from the scope of the invention.

I claim:

1. A computer implemented method for performing risk and credit analysis of financial service applications with a neural network having an input layer of processing nodes, an output layer having a processing node, and an intermediate layer of processing nodes coupling the input layer to the output layer by weighted connections, the method comprising the steps of:

collecting data and status information from a plurality of previously approved financial service applications;

applying the data into the input layer of the neural network;

organizing the data at the input layer of the neural network into a plurality of groups, each of the plurality of groups containing variables used to perform risk and credit analysis;

classifying the grouped data from each of the plurality of groups into ordinal values and categorical values;

applying each of the plurality of groups of data from the processing nodes of the input layer to a separate processing node of the intermediate layer of the neural network;

applying the data from each of the separate processing nodes at the intermediate layer of the neural network to the processing node of the output layer;

optimizing the weighted connections of the neural network to an approval criteria that increases approval volume of financial service applications with a minimum loss; and providing data from a recently filed financial service application to the optimized neural network for evaluation.

2. The method according to claim 1, wherein the status information from the plurality of previously approved financial service applications comprises a termination due to default in payment, an early termination by a financial service applicant, a normal termination, and a financial service account open without any delinquencies in payment.

3. The method according to claim 2, further comprising the step of arranging the status information into an acceptable class and an unacceptable class, the acceptable class comprising a normal termination, and a financial service account open without any delinquencies in payment, the unacceptable class comprising a termination due to default in payment and a early termination by a financial service applicant.

4. The method according to claim 3, further comprising the step of determining vulnerability for the data in each of the plurality of groups at the input layer.

5. The method according to claim 1, wherein the plurality of groups applied to the separate processing nodes in the intermediate layer comprise employment stability, residential stability, credit history, debt and income history, and miscellaneous variables.

6. The method according to claim 1, further comprising the step of sorting the ordinal values for each of the plurality of groups in an ordered ranking from a highest ordinal value to a lowest ordinal value, the highest ordinal value assigned a one, the lowest ordinal value assigned a zero, and values in between the highest and lowest ordinal value assigned a value scaled linearly between zero and one.

7. The method according to claim 1, wherein the weighted connections are determined according to a multiple regression analysis using the data and status information, the weighted connections are sorted, ranked, and normalized to values between zero and one.

8. The method according to claim 7, further comprising sending the weighted connections to a credit manager for examination and for inferring a direction of relaxation to achieve business expansion while controlling loss.

9. The method according to claim 1, further comprising the step of screening the recently filed financial service application in accordance with the approval criteria, the recently filed financial service application approved if risk is minimal and rejected if risk is high.

10. A system for performing risk and credit analysis of financial service applications comprising:

a data storage for storing data and status information from a plurality of previously approved financial service applications;

means for pre-processing the data into a plurality of groups, each of the plurality of groups containing variables used to perform risk and credit analysis;

a neural network having an input layer of processing nodes, an output layer having a processing node, and an intermediate layer of processing nodes coupling the input layer to the output layer by weighted connections, the pre-processed data received at the input layer of the neural network, the input layer of the neural network organizing the data into a plurality of groups, each of the plurality of groups containing variables used to perform risk and credit analysis; each of the plurality of groups of data from the processing nodes of the input layer applied to a separate processing node of the intermediate layer of, the data from each of the separate processing nodes at the intermediate layer applied to the processing node of the output layer of the neural network;

means for optimizing the neural network to an approval criteria that increase approval volume of financial service applications; and a processor coupled to the optimized neural network for providing data from a recently filed financial service application to the optimized neural network, the optimized neural network determining the risk of the recently filed financial service application in accordance with the approval criteria.

11. The system according to claim 10, wherein the preprocessing means classifies the grouped data from each of the plurality of groups into ordinal values and categorical values.

12. The system according to claim 11, wherein the status information from the plurality of previously approved financial service applications comprises a termination due to default in payment, an early termination by a financial service applicant, a normal termination, and a financial service account open without any delinquencies in payment.

13. The system according to claim 12, further comprising means for arranging the status information into an acceptable class and an unacceptable class, the acceptable class comprising a normal termination, and a financial service account open without any delinquencies in payment, the unacceptable class comprising termination due to default in payment and an early termination by a financial service applicant.

14. The system according to claim 13, further comprising means for determining vulnerability for the data in each of the plurality of groups at the input layer.

15. The system according to claim 11, further comprising means for sorting the ordinal values for each of the plurality of groups in an ordered ranking from a highest ordinal value to a lowest ordinal value, the highest ordinal value assigned a one, the lowest ordinal value assigned a zero, and values in between the highest and lowest ordinal value assigned a value scaled linearly between zero and one.

16. The system according to claim 10, wherein the plurality of groups applied to the separate processing nodes in the intermediate layer comprise employment stability, residential stability, credit history, debt and income history, and miscellaneous variables.

17. The system according to claim 10, wherein the weighted connections are determined according to a multiple regression analysis using the data and status information, the weighted connections are sorted, ranked, and normalized to values between zero and one.

18. The system according to claim 17, further comprising means for sending the weighted connections to a credit manager for examination and for inferring a direction of relaxation to achieve business expansion while controlling loss.

19. A computer implemented method for performing risk and credit analysis of financial service applications comprising the steps of:

collecting data from a plurality of previously approved financial service applications;

organizing the data into a plurality of groups each containing variables used to perform risk and credit analysis;

constructing a neural network having an input layer of processing nodes, an output layer having a processing node, and an intermediate layer of processing nodes coupling the input layer to the output layer, wherein the input layer of processing nodes are separated according to each of the plurality of groups and each of the groups are applied to a separate processing node in the intermediate layer;

determining weighted connections between the processing nodes in the input layer, the intermediate layer, and the output layer of the neural network with a non-iterative regression;

optimizing the weighted connections of the neural network for inferring a direction to achieve business expansion; and providing data from a recently filed financial service application to the optimized neural network for evaluation.

20. The computer-implemented method according to claim 19, further comprising the step of classifying the grouped data from each of the plurality of groups into ordinal values and categorical values.

21. The computer-implemented method according to claim 20, further comprising the step of sorting the ordinal values for each of the plurality of groups in an ordered ranking from a highest ordinal value to a lowest ordinal value, the highest ordinal value assigned a one, the lowest ordinal value assigned a zero, and values in between the highest and lowest ordinal value assigned a value scaled linearly between zero and one.

22. The computer-implemented method according to claim 19, further comprising the step of determining status information from the plurality of previously approved financial service applications, wherein the status information comprises a termination due to default in payment, an early termination by a financial service applicant, a normal termination, and a financial service account open without any delinquencies in payment.

23. The computer-implemented method according to claim 22, further comprising the step of arranging the status information into an acceptable class and an unacceptable class, the acceptable class comprising a normal termination, and a financial service account open without any delinquencies in payment, the unacceptable class comprising a termination due to default in payment and an early termination by a financial service applicant.

24. The computer-implemented method according to claim 23, further comprising the step of determining vulnerability for the data in each of the plurality of groups at the input layer.

25. The computer-implemented method according to claim 19, wherein the plurality of groups applied to the separate processing nodes in the intermediate layer comprise employment stability, residential stability, credit history, debt and income history, and miscellaneous variables.

26. The computer-implemented method according to claim 19, further comprising the step of sorting, ranking, and normalizing the weighted connections to values between zero and one.

27. A system for performing risk and credit analysis of financial service applications comprising:

a data storage for storing data from a plurality of previously approved financial service applications;

means for pre-processing the data into a plurality of groups, each of the plurality of groups containing variables used to perform risk and credit analysis;

means for constructing a neural network having an input layer of processing nodes, an output layer having a processing node, and an intermediate layer of processing nodes coupling the input layer to the output layer, wherein the input layer of processing nodes are separated according to each of the plurality of groups and each of the groups are applied to a separate processing node in the intermediate layer;

means for determining weighted connections between the processing nodes in the input layer, the intermediate layer, and the output layer of the neural network with a non-iterative regression;

means for optimizing the weighted connections of the neural network for inferring a direction to achieve business expansion; and a processor coupled to the optimized neural network for providing data from a recently filed financial service application to the optimized neural network, the optimized neural network determining the risk of the recently filed financial service application.

28. The system according to claim 27, wherein the pre-processing means classifies the grouped data from each of the plurality of groups into ordinal values and categorical values.

29. The system according to claim 28, wherein the pre-processing means sorts the ordinal values for each of the plurality of groups in an ordered ranking from a highest ordinal value to a lowest ordinal value, the highest ordinal value assigned a one, the lowest ordinal value assigned a zero, and values in between the highest and lowest ordinal value assigned a value scaled linearly between zero and one.

30. The system according to claim 27, wherein the pre-processing means determines status information from the plurality of previously approved financial service applications, wherein the status information comprises a termination due to default in payment, an early termination by a financial service applicant, a normal termination, and a financial service account open without any delinquencies in payment.

31. The system according to claim 30, wherein the pre-processing means arranges the status information into an acceptable class and an unacceptable class, the acceptable class comprising a normal termination, and a financial service account open without any delinquencies in payment, the unacceptable class comprising a termination due to default in payment and a early termination by a financial service applicant.

32. The system according to claim 31, wherein the pre-processing means determines vulnerability for the data in each of the plurality of groups at the input layer.

33. The system according to claim 27, wherein the plurality of groups applied to the separate processing nodes in the intermediate layer comprise employment stability, residential stability, credit history, debt and income history, and miscellaneous variables.

34. The system according to claim 27, wherein the weight determining means sorts, ranks, and normalizes the weighted connections to values between zero and one.

\* \* \* \* \*